United States Patent [19]
Lin

[11] Patent Number: 5,515,643
[45] Date of Patent: May 14, 1996

[54] MOSQUITO KILLER

[76] Inventor: Dennis Lin, P.O. Box 82-144, Taipei, Taiwan

[21] Appl. No.: 415,675

[22] Filed: Apr. 3, 1995

[51] Int. Cl.⁶ ............................................. A01M 1/22
[52] U.S. Cl. ............................................. 43/112; 43/113
[58] Field of Search ............................. 43/112, 113, 132.1

[56] References Cited

U.S. PATENT DOCUMENTS

| | | | |
|---|---|---|---|
| 1,723,919 | 8/1929 | Bykowy | 43/113 |
| 3,950,886 | 4/1976 | Newhall et al. | 43/112 |
| 3,986,292 | 10/1976 | Klebanoff | 43/112 |

Primary Examiner—Jack W. Lavinder
Assistant Examiner—Jeanne M. Elpel
Attorney, Agent, or Firm—Alfred Lei

[57] ABSTRACT

A mosquito killer including an upper cover having a center hole, a handle having a lower end extending downwardly through the center hole of the upper cover to engage with a stopper, a lower cover, a collapsible cross frame having upper ends slidably connected with the upper cover and lower ends slidably connected the lower cover, a lamp seat slidably installed on the cross frame, a protective net disposed between the upper cover and the lower cover, and an electric net arranged within the protective net.

1 Claim, 8 Drawing Sheets

MOSQUITO KILLER

BACKGROUND OF THE INVENTION

1. Field of the Invention

This invention relates to a collapsible mosquito killer.

2. Description of the Prior Art

It has been found that the conventional mosquito killer is simply a device with an electric net surrounding the device. However, such a device is too bulky in volume and cannot be folded when not in use thereby causing much inconvenience in stowage.

Therefore, it is an object of the present invention to provide a mosquito killer which can obviate and mitigate the above-mentioned drawbacks.

SUMMARY OF THE INVENTION

This invention relates to a mosquito killer.

It is the primary object of the present invention to provide a mosquito killer which is collapsible.

It is another object of the present invention to provide a mosquito killer which is easy for transportation.

It is still another object of the present invention to provide a mosquito killer which is convenient to use.

It is still another object of the present invention to provide a mosquito killer which is facile to stow.

It is a further object of the present invention to provide a mosquito killer which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 1:
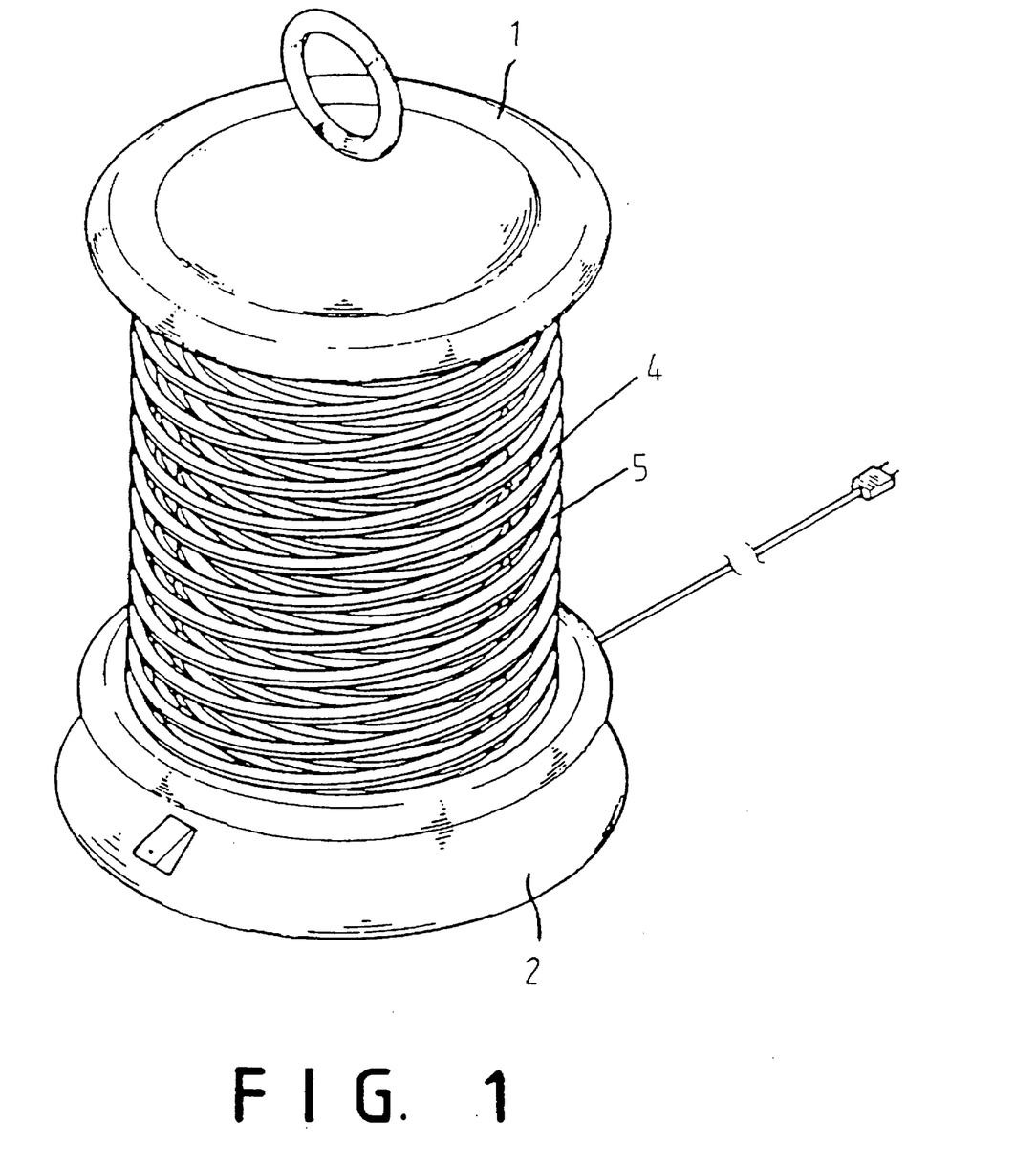
FIG. 1 is a perspective view of the present invention.
Figure 2:
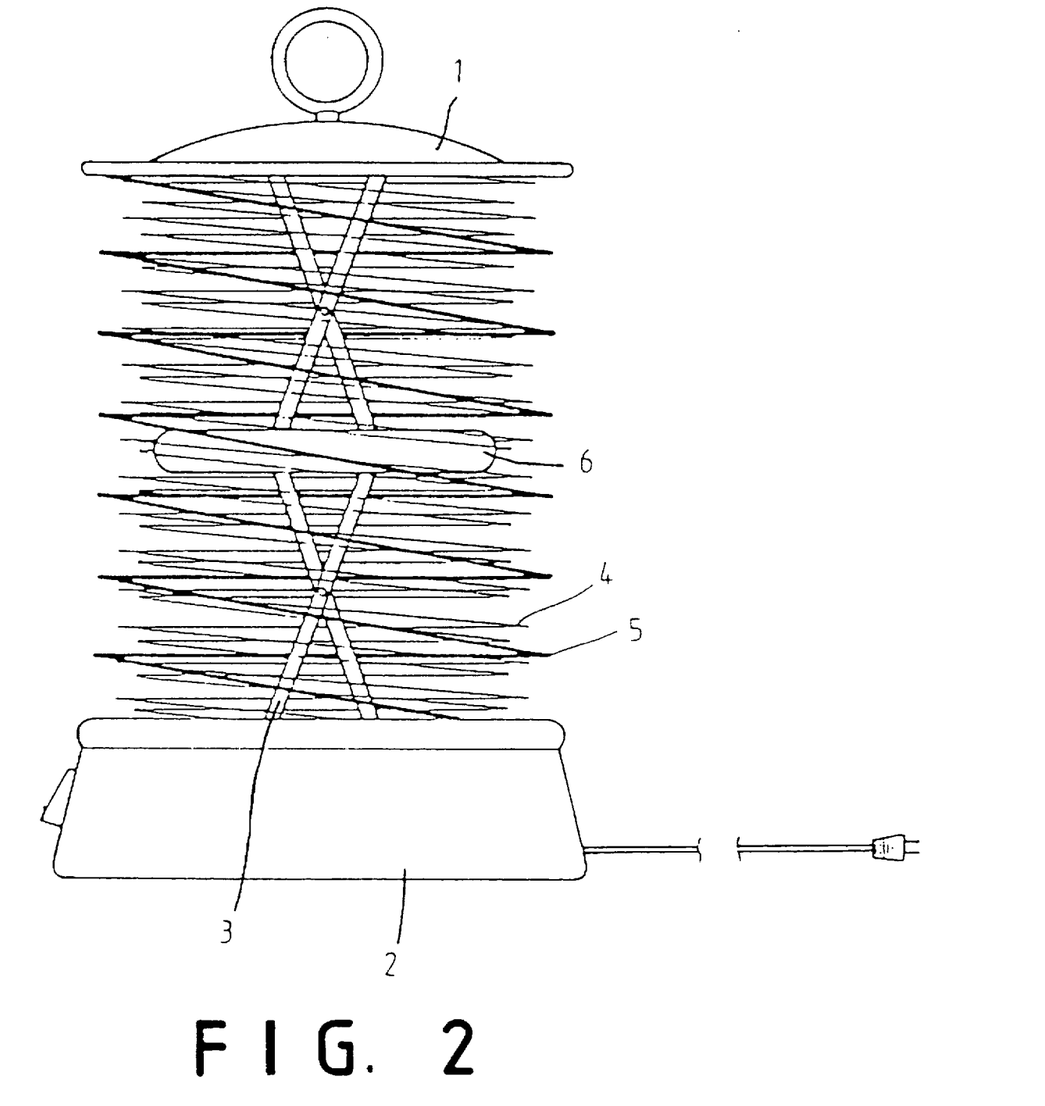
FIG. 2 is a side view of the present invention.
Figure 4:
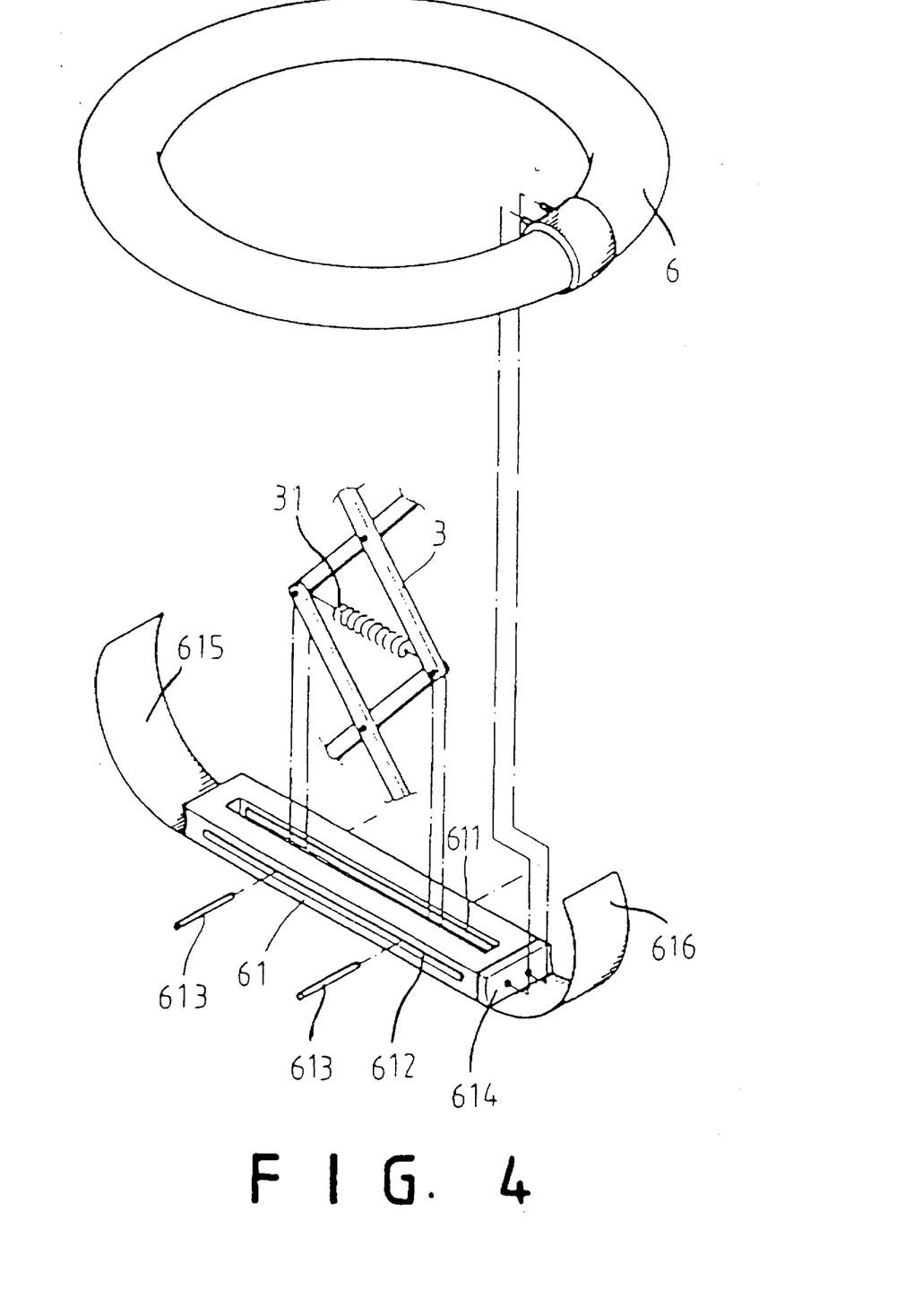
FIG. 4 shows the connection between the cross frame and the lamp seat.

With reference to the drawings and in particular to FIGS. 1 and 2 thereof, the mosquito killer according to the present invention mainly comprises an upper cover 1, a lower cover 2, a cross frame 3, an electric net 4, a protective net 5, and a lamp seat 61 (see FIG. 4).

Figure 3:
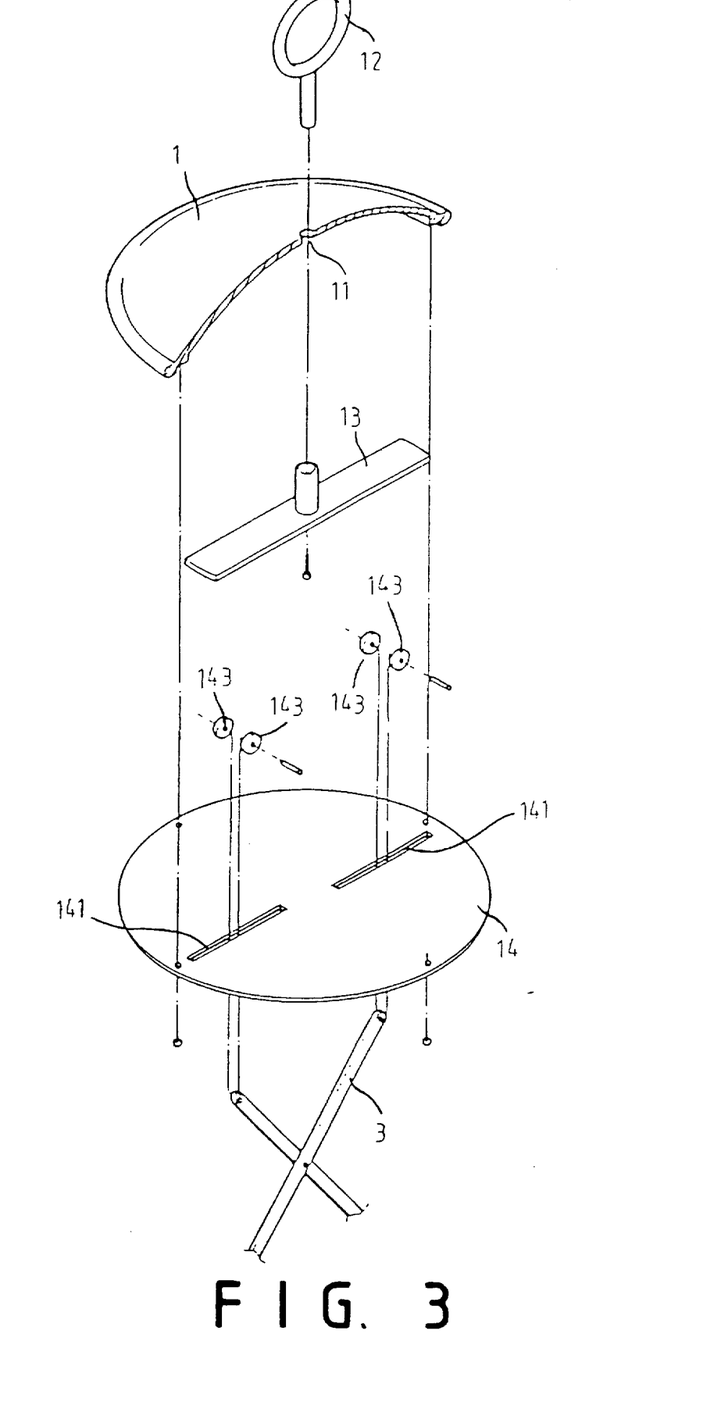
FIG. 3 is an exploded view of the upper portion of the present invention.

As shown in FIG. 3, the upper cover 1 is a circular member formed with a center hole 11. The lower end of a handle 12 extends downwardly through the center hole 11 of the upper cover to engage with a stopper 13 by means of a screw. A first circular disk 14 is fitted on the bottom of the upper cover 1. The circular disk 14 has two opposite slots 141 and 142 through which extend the upper ends of the cross frame 3. The cross frame 3 is composed a first rod, a second rod having a center pivotally connected with the center of the first rod, a third rod having an upper end pivotally connected with a lower end of the first rod, and a fourth rod having a center pivotally connected with the center of the third rod and having an upper end pivotally connected with a lower end of the second rod. Between the lower ends of the first and second rods is mounted a compressed spring 31. The upper ends of the cross frame 3 are each connected with a pair of rollers 143 so that the upper ends of the cross frame 3 can slide along the slots 141 and 142 thereby enabling the cross frame 3 to be folded or opened smoothly.

Referring to FIG. 4, the intermediate portion of the cross frame 3 is engaged with the lamp seat 61. The lamp seat 61 is formed with a first through slot 611 extending from the top to the bottom and a second through slot 612 extending from one side the other so that the cross frame 3 can extend upwardly through the slot 611 of the lamp seat 61 and the intermediate portion of the cross frame 3 is slidably engaged with the lamp seat 61 by two pins 613 extending through the slot 612 and the intermediate portion of the cross frame 3. Further, the lamp seat 61 is provided with two curved supporting members 615 and 616 at two ends and a socket 614 at an end thereof. A circular lamp 6 is arranged on the curved supporting members 615 and 616 of the lamp seat 61 and electrically connected with the socket 614.

Figure 5:
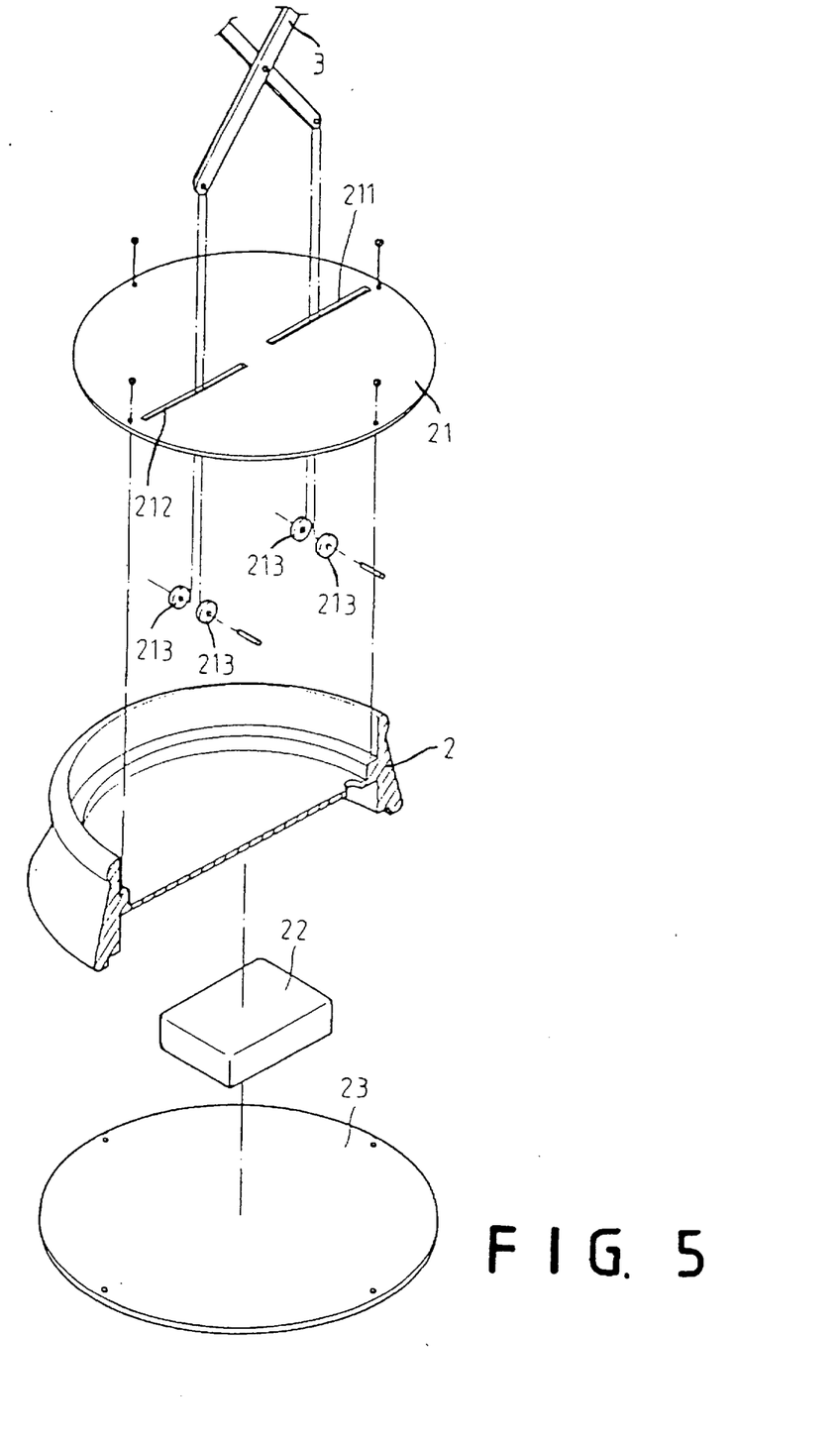
FIG. 5 is an exploded view of the lower portion of the present invention.

Turning now to FIG. 5, the lower ends of the cross frame 3 extend through two opposite slots 211 and 212 of a second circular disk 21 and each provided with a pair of rollers 213 so that the lower ends of the cross frame 3 can move along the slots 211 and 212 of the second circular disk 21 smoothly. The lower cover 2 is disposed under the second circular disk 21. Under the lower cover 2 there is a transformer 22 for supplying electricity to the electric net 4. The lower cover 2 is closed with a bottom plate 23.

Figure 6A:
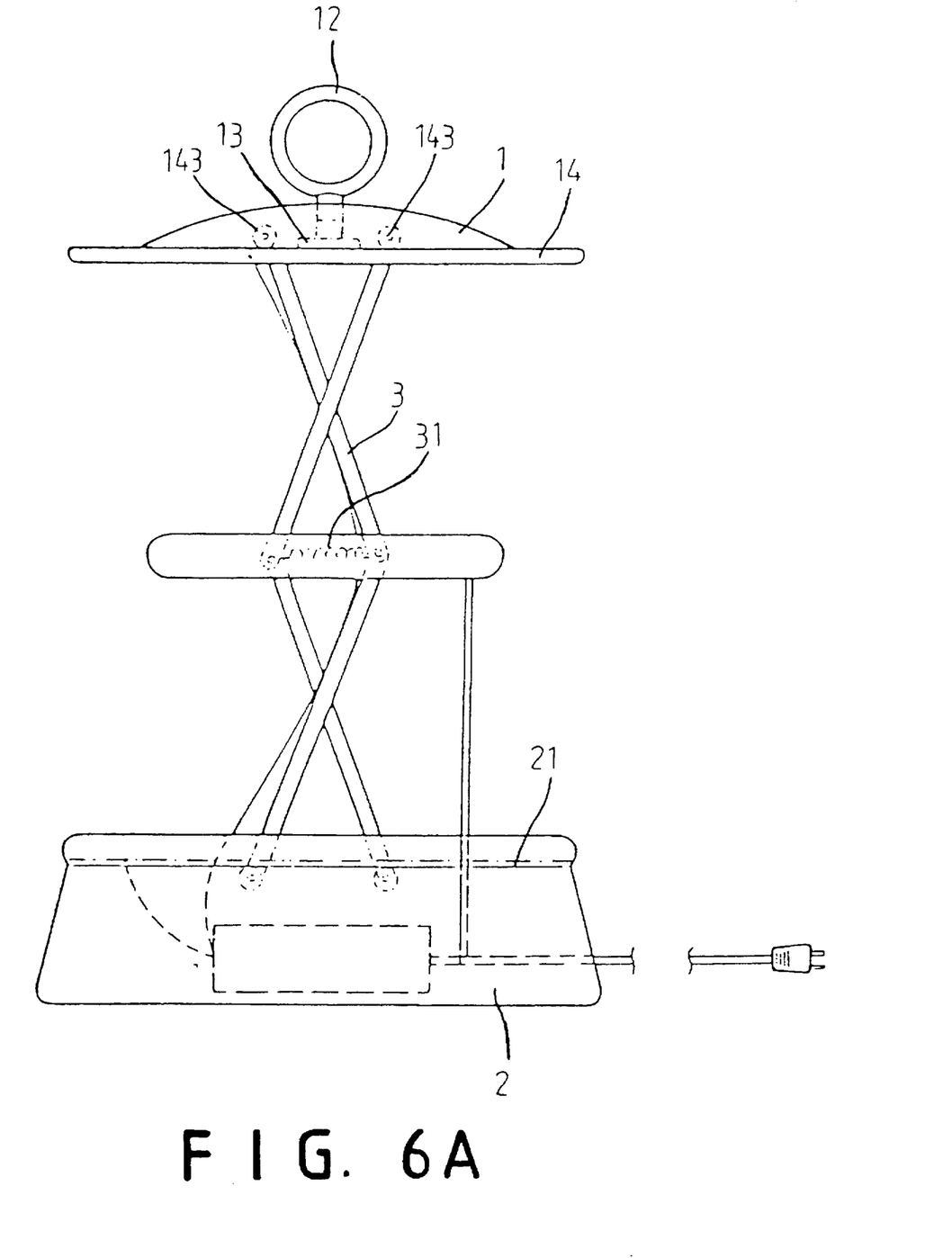
FIG. 6A illustrates the expansion condition of the present invention.
Figure 6B:
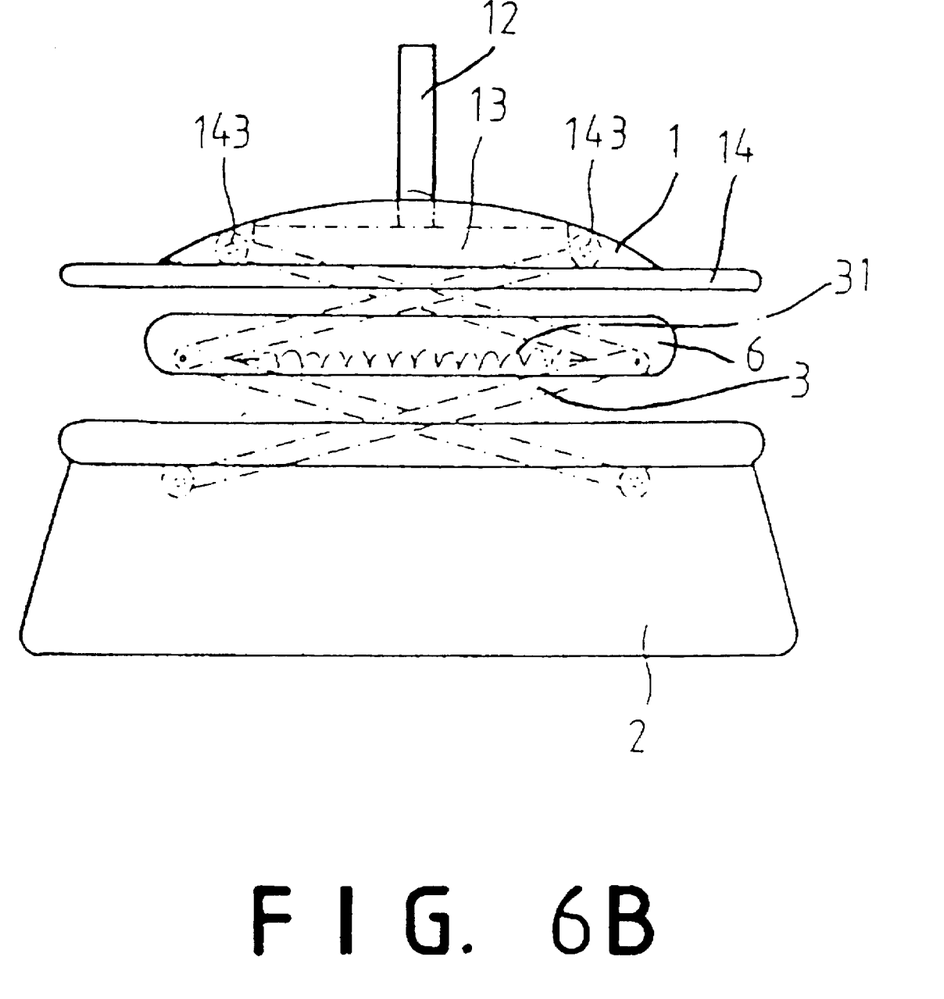
FIG. 6B illustrates the collapsed condition of the present invention.
Figure 7:
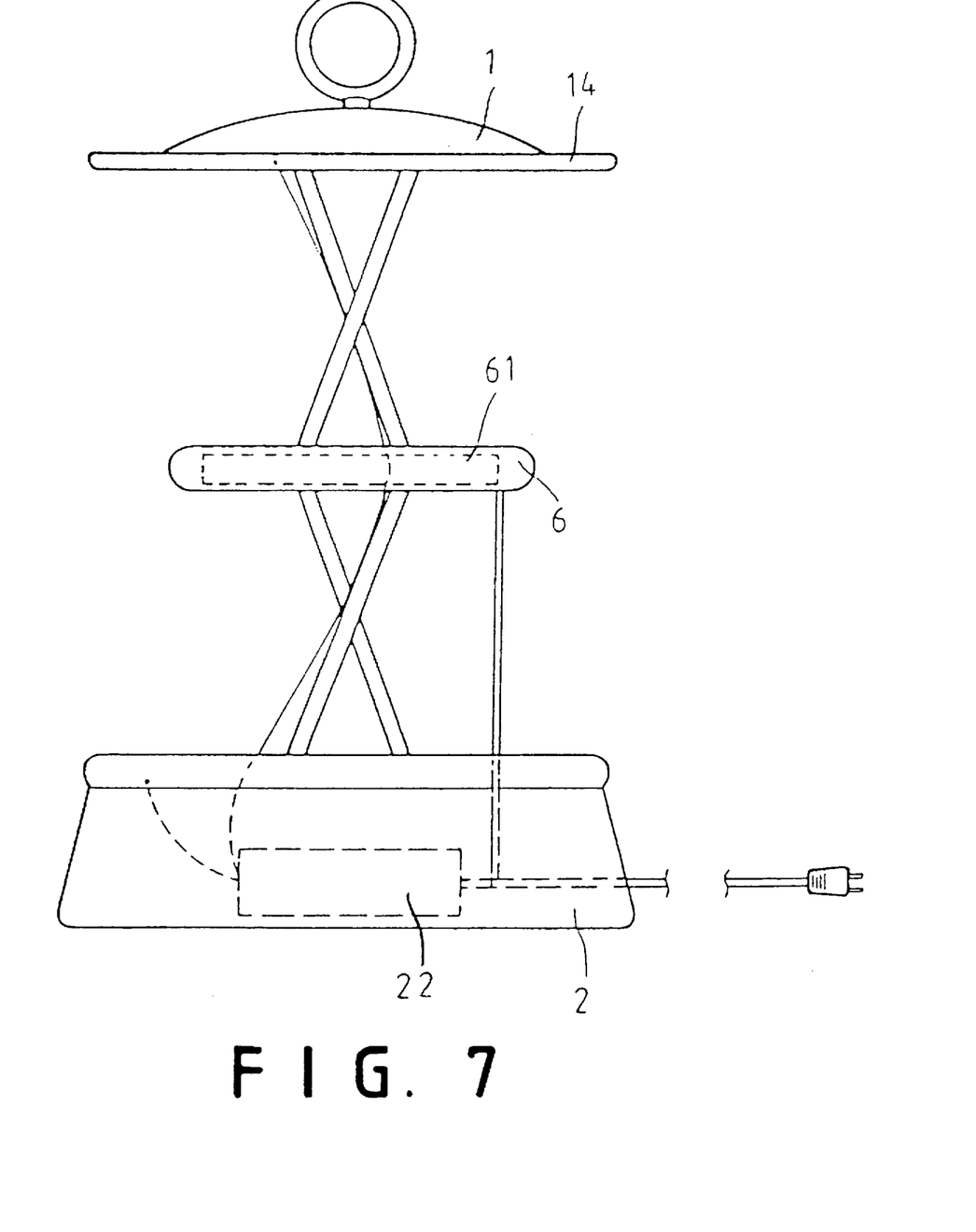
FIG. 7 is a side view of the present invention.

When in use, the compressed spring 31 will force the intermediate portion of the cross frame 3 to expand as shown in FIG. 6A. When not in use, it it only necessary to press the upper cover 1 and then turn the handle 12 to rotate the stopper 13 against the roller 143 hence keeping the cross frame 3 at a collapsed condition (see FIG. 6B).

The electrical connection between the electrical plug and the lamp 6 may be of any conventional design well known to those skilled in the art and is not considered a part of the invention.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A mosquito killer comprising:

an upper cover having a center hole;

a handle having a lower end extending downwardly through the center hole of said upper cover to engage with a stopper;

a lower cover;

a collapsible cross frame having upper ends slidably connected with said upper cover and lower ends slidably connected said lower cover;

a lamp seat slidably installed on said cross frame;

a protective net disposed between said upper cover and said lower cover; and an electric net arranged within said protective net.

* * * * *